(12) United States Patent
Hsu (10) Patent No.: US 8,967,862 B2
(45) Date of Patent: Mar. 3, 2015

(54) SLIDER ASSEMBLY

(71) Applicant: Chieftek Precision Co., Ltd., Tainan (TW)

(72) Inventor: Ming-Che Hsu, Tainan (TW)

(73) Assignee: Chieftek Precision Co., Ltd., Tainan (TW)

( * ) Notice: Subject to any disclaimer, the term of this patent is extended or adjusted under 35 U.S.C. 154(b) by 0 days.

(21) Appl. No.: 14/306,357

(22) Filed: Jun. 17, 2014

(65) Prior Publication Data

US 2014/0376838 A1 Dec. 25, 2014

(30) Foreign Application Priority Data

Jun. 19, 2013 (TW) .............................. 102121797 A (51) Int. Cl.
*F16C 29/06* (2006.01)

(52) U.S. Cl.
CPC ......... *F16C 29/0602* (2013.01); *F16C 2300/28* (2013.01)
USPC .......................................................... 384/45

(58) Field of Classification Search
USPC ..................................... 384/44, 45
See application file for complete search history.

(56) References Cited

U.S. PATENT DOCUMENTS

| 4,582,369 | A | * | 4/1986 | Itoh .................................. | 384/13 |
| 4,743,124 | A | * | 5/1988 | Blaurock ......................... | 384/45 |
| 4,932,067 | A | * | 6/1990 | Pester et al. .................... | 384/45 |
| 5,129,736 | A | * | 7/1992 | Tanaka ............................ | 384/45 |
| 5,161,896 | A | * | 11/1992 | Hofling et al. .................... | 384/8 |
| 5,391,003 | A | * | 2/1995 | Ooya ............................... | 384/44 |
| 6,729,760 | B2 | * | 5/2004 | Mochizuki et al. ............. | 384/45 |
| 7,204,036 | B2 | * | 4/2007 | Kato et al. ...................... | 33/706 |
| 7,717,622 | B2 | * | 5/2010 | Winkler .......................... | 384/45 |
| 8,123,408 | B2 | * | 2/2012 | Nishiwaki ....................... | 384/44 |
| 8,858,082 | B2 | * | 10/2014 | Hsu ................................. | 384/43 |
| 2003/0035600 | A1 | * | 2/2003 | Michioka et al. ............... | 384/44 |
| 2005/0213855 | A1 | * | 9/2005 | Shing-Neng et al. ........... | 384/44 |

\* cited by examiner

*Primary Examiner* — Thomas R. Hannon
(74) *Attorney, Agent, or Firm* — Rosenberg, Klein & Lee (57) ABSTRACT

A slider assembly configured to move on a slide rail along an axial direction without limitation in distance is provided to solve the problems of the middle retaining members of a conventional circulation maintaining device, e.g., insufficient connection rigidity and inconvenience in manufacture and assembly. The positioning portion of a middle retaining member and the positioning portion of the protrusion of a slider are connected in a direction perpendicular to both the axial direction and a transverse direction in which the protrusion projects, thereby connecting the middle retaining member and the protrusion securely and evenly along their entire lengths. The middle retaining member and the protrusion also feature ease of manufacture and assembly.

11 Claims, 12 Drawing Sheets

SLIDER ASSEMBLY

FIELD OF THE INVENTION

The present invention relates to a slider assembly and more particularly to a slider assembly in which a protrusion is provided between two rail surfaces of a slider and in which the protrusion is connected with a middle retaining member in a direction perpendicular to an axial direction and to a transverse direction in which the protrusion projects so as to provide sufficient connecting strength and facilitate production and assembly.

BACKGROUND OF THE INVENTION

When a slider assembly including a circulation maintaining device and a slider is mounted astride a slide rail, a plurality of closed circulation channels are formed jointly by the circulation maintaining device, the slider, and the slide rail. The circulation channels include a load channel formed between the slider and the slide rail, two turning channels respectively formed at two end surfaces of the slider, and return channels in the slider. Rows of rolling elements are received in the circulation channels and can roll in the circulation channels in a circulating manner without limitation in distance, thereby enabling the slider assembly to move smoothly along the slide rail.

More specifically, the load channel in the circulation channels is formed jointly by retaining members provided by the circulation maintaining device, rail surfaces of the slider, and rail surfaces of the slide rail. The retaining members have generally the same length as the rail surfaces of the slider, are shaped as long, narrow pieces, and generally include upper retaining members, middle retaining members, and lower retaining members. The upper and lower retaining members, which are located above and below the rolling elements respectively, can be fixed or connected in their middle sections, from above and below respectively, for enhanced rigidity. The middle retaining members, however, which are located at half-height of the slide rail and therefore subject to limitation of space between the slide rail and the slider, are connected and secured at the end portions, as is typical of the conventional circulation maintaining devices (see U.S. Pat. No. 6,729,760 "Motion guide device" and US Patent Application Publication No. 20030035600A1 "Rolling element interference preventer and a guide device" for example). As the rolling elements tend to push one another and push against the retaining members while rolling in the load channel, it is likely that the rolling elements will fall out somewhere between the two ends of each middle retaining member, causing damage to the slider assembly.

To increase the rigidity of a middle retaining member in its middle section, U.S. Pat. No. 7,204,036B2 "Linear guide apparatus" and U.S. Pat. No. 8,123,408B2 "Linear motion guide unit" disclose supporting, and thus enhancing the rigidity of, a middle retaining member by means of an elongated component made of a high-rigidity material such as steel. However, as the high-rigidity component can be fixed only at its two ends too, the improvement is limited, and this solution does not respond well to the trend of having increasingly longer slider rigid bodies. To overcome this shortcoming, U.S. Pat. No. 5,129,736 "Indefinite linear motion guide unit having four endless circulating paths" proposes passing a bolt transversely through each of the two solid feet of a slider from outside so as to fasten each middle retaining member to the slider at a position between two rail surfaces. However, not only is it difficult to make threaded through holes in the two feet of a solid rigid body, but also the number of components and the complexity of assembly will be increased. All of these contribute to a rise in production cost.

SUMMARY OF THE INVENTION

In view of the above, the present invention puts forward a slider assembly which can adapt to the increasing lengths of slider rigid bodies, which allows the middle retaining members of a circulation maintaining device to be connected to a slider in such a way that sufficient connecting strength exists along the entire length of each middle retaining member, and which advantageously features easy manufacture and assembly without incurring additional costs.

The slider assembly of the present invention is configured to move in a linear and reciprocating manner on a slide rail along an axial direction by means of circulating rolling movement of rows of rolling elements.

The slider assembly includes a slider and a middle retaining member. The slider is provided with at least one foot. The foot has at least two rail surfaces and a protrusion between the two rail surfaces. The protrusion projects in a transverse direction, extends along the axial direction, and is provided with a first positioning portion. The middle retaining member extends along the axial direction and is provided with a second positioning portion. By connecting the second positioning portion with the first positioning portion, the middle retaining member is fixed to the protrusion. More specifically, the first positioning portion and the second positioning portion are connected along the axial direction and in a direction (hereinafter referred to as the connecting direction) perpendicular to both the axial direction and the transverse direction. Preferably, the middle retaining member and the protrusion are connected along their entire lengths in the axial direction.

In one embodiment of the present invention, there are a plurality of first positioning portions arranged at intervals along the axial direction and a plurality of second positioning portions arranged at intervals along the axial direction. If the middle retaining member is equally divided along the axial direction into two end portions and a middle portion between the two end portions, it is preferable that the two end portions and the middle portion are at least each provided with one second positioning portion.

In one embodiment of the present invention, the middle retaining member is provided with a groove along the axial direction. The groove, to be mounted on the protrusion of the slider, has an inner surface including two opposite lateral surfaces configured to connect with the protrusion in a precise manner. The inner surface of the groove further includes a bottom surface connecting the two opposite lateral surfaces. In addition, the first positioning portion is a positioning hole extending through the protrusion in a direction perpendicular to both the axial direction and the transverse direction. The positioning hole can be made by a processing process carried out directly from below the slider without being interfered by other components. The second positioning portion, on the other hand, is a positioning block. The positioning block is aligned with the first positioning portion, is located on either of the two opposite lateral surfaces of the groove, and extends toward the bottom surface of the groove. When there are a plurality of such positioning blocks located on the two opposite lateral surfaces of the groove, the positioning blocks on one of the two opposite lateral surfaces of the groove may correspond to the positioning blocks on the other of the two opposite lateral surfaces respectively along the axial direction. Or, the positioning blocks on one of the two opposite lateral surfaces of the groove may be alternately arranged with respect to the positioning blocks on the other of the two opposite lateral surfaces along the axial direction.

In one embodiment of the present invention, the middle retaining member is made of an elastic material such as plastic or metal, the second positioning portion is a positioning block which increases in size toward the bottom surface of the groove, and the middle retaining member is mounted on the protrusion along the opposite direction of the transverse direction.

In one embodiment of the present invention, the positioning block of the middle retaining member has an end portion which is adjacent to the bottom surface of the groove and provided with a recess, making it easier for the positioning block to engage in the positioning hole of the protrusion.

In one embodiment of the present invention, both the first positioning portion and the second positioning portion are through holes, and a pin is inserted through the through holes to connect the middle retaining member and the protrusion. Preferably, the middle retaining member is provided with a groove along the axial direction, the groove of the middle retaining member is mounted on the protrusion of the slider, the groove has an inner surface including two opposite lateral surfaces, and the pin extends through the two opposite lateral surfaces to connect the middle retaining member and the protrusion.

In one embodiment of the present invention, the middle retaining member has two retaining surfaces for retaining rolling elements, and each of the retaining surfaces has a guide groove for guiding a retaining chain.

The present invention has the following advantageous effects:

1. The first positioning portion of the protrusion—be it a positioning hole for engaging with a positioning block or a through hole through which a pin can extend—can be manufactured directly from below the slider without interference by other components, thus featuring easy manufacture and assembly and low production cost.
2. Once the middle retaining member and the protrusion of the slider are connected by connection of the first and second positioning portions in the connecting direction, the middle retaining member and the protrusion are restricted to the same extent anywhere along their entire lengths in the axial direction. As a result, the connecting strength of the middle retaining member and the protrusion is enhanced, allowing the two parts to withstand greater stress as a whole. Further, as the middle retaining member is effectively prevented from sliding and deformation, the smoothness of motion of the rolling elements will be increased.
3. Since the middle retaining member of the present invention is made of an elastic material, the groove of the middle retaining member can be forced open to facilitate the engagement of the positioning block in the groove and the positioning hole in the protrusion of the slider, thereby increasing the convenience of installation of the middle retaining member.

BRIEF DESCRIPTION OF THE DRAWINGS

The invention as well as a preferred mode of use and the advantages thereof will be best understood by referring to the following detailed description of some illustrative embodiments in conjunction with the accompanying drawings, in which.

DETAILED DESCRIPTION OF THE INVENTION

The technical features and major effects of the slider assembly of the present invention will be clearly shown via the following embodiments.

The slider assembly of the present invention can move on a slide rail E along an axial direction S in a linear and reciprocating manner thanks to the circulating rolling movement of rows of rolling elements R, as explained in more detail below with reference to the drawings, particularly FIG. 8, in which the direction perpendicular to the page is defined as the axial direction S.

Figure 1:
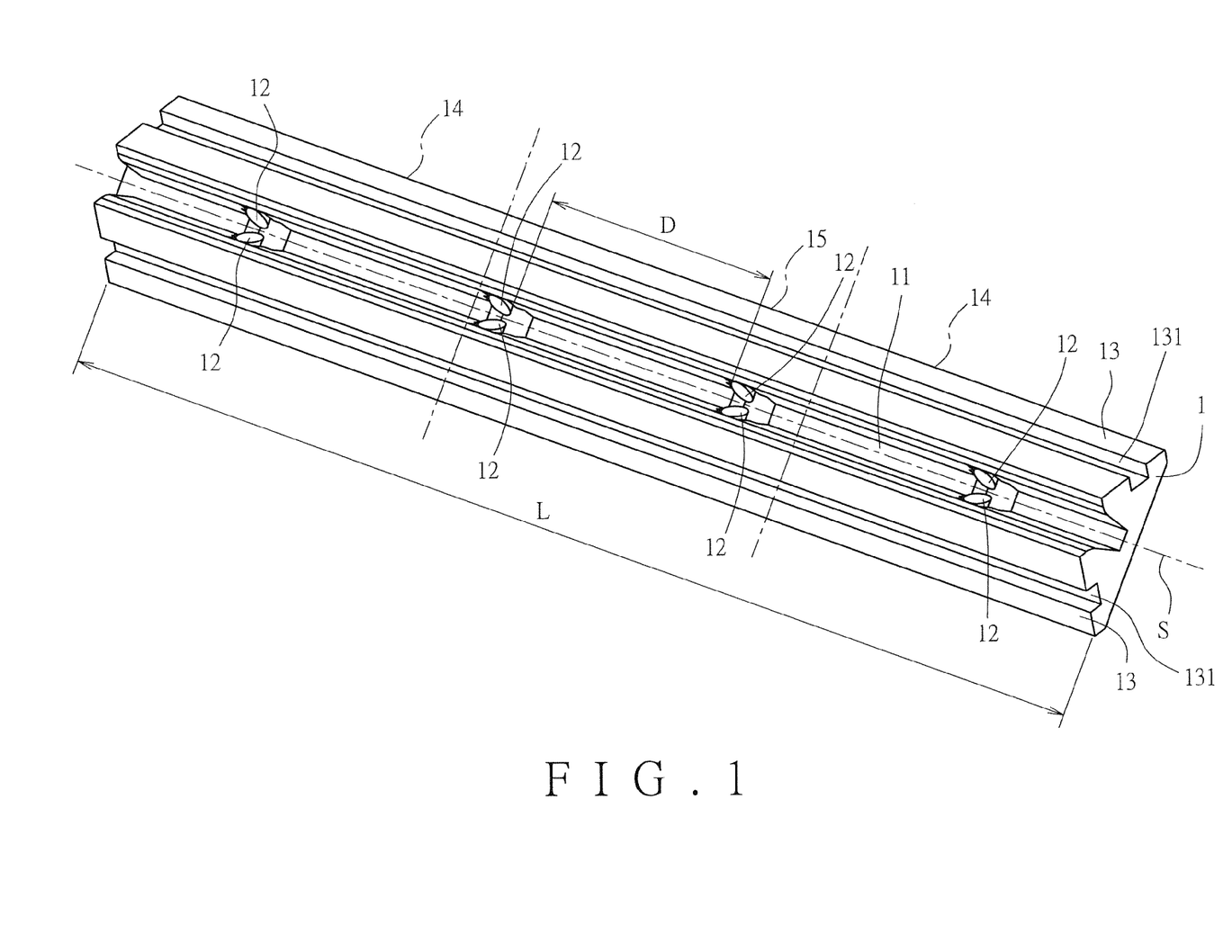
FIG. 1 is a perspective view of the middle retaining member in the first embodiment of the present invention.
Figure 2:
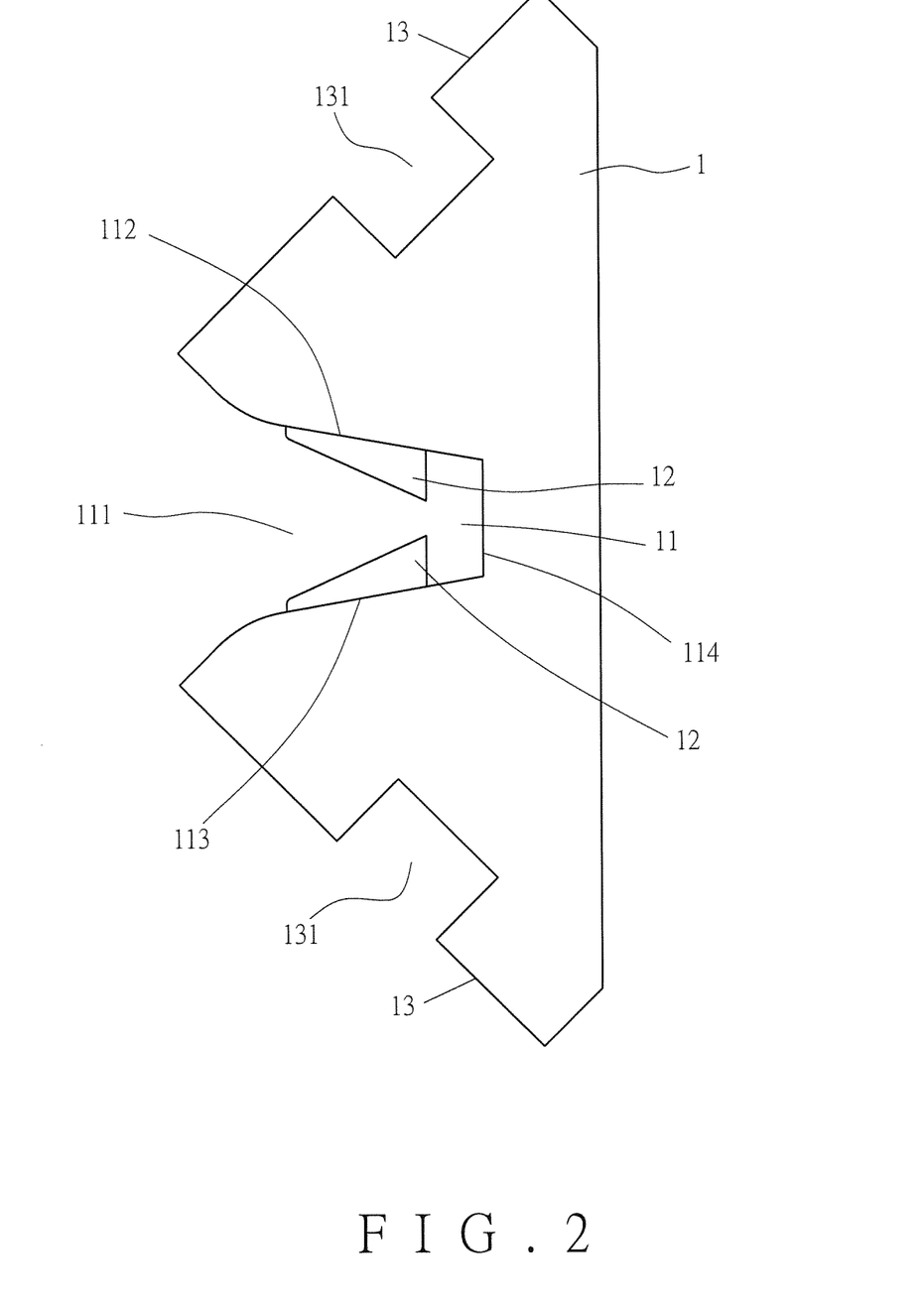
FIG. 2 is a side view of the middle retaining member shown in FIG. 1.

Referring to FIG. 1 and FIG. 2 for the first embodiment of the present invention, a middle retaining member 1 extends along the axial direction S and is provided with a groove 11 along the axial direction S. The groove 11 has an opening 111. The inner surface of the groove 11 includes two opposite lateral surfaces 112 and 113 and a bottom surface 114 connecting the two lateral surfaces 112 and 113. A plurality of positioning blocks 12 are evenly arranged on each of the two lateral surfaces 112 and 113, wherein the positioning blocks 12 on the lateral surface 112 correspond in position to the positioning blocks 12 on the lateral surface 113 respectively. The middle retaining member 1 is made of an elastic material such as plastic or metal. The positioning blocks 12 on the two lateral surfaces 112 and 113 increase in size toward the bottom surface 114. The middle retaining member 1 is further provided with two retaining surfaces 13 for retaining the rolling elements R. Each of the two retaining surfaces 13 has a guide groove 131 for guiding a retaining chain Z (see FIG. 8).

Figure 3:
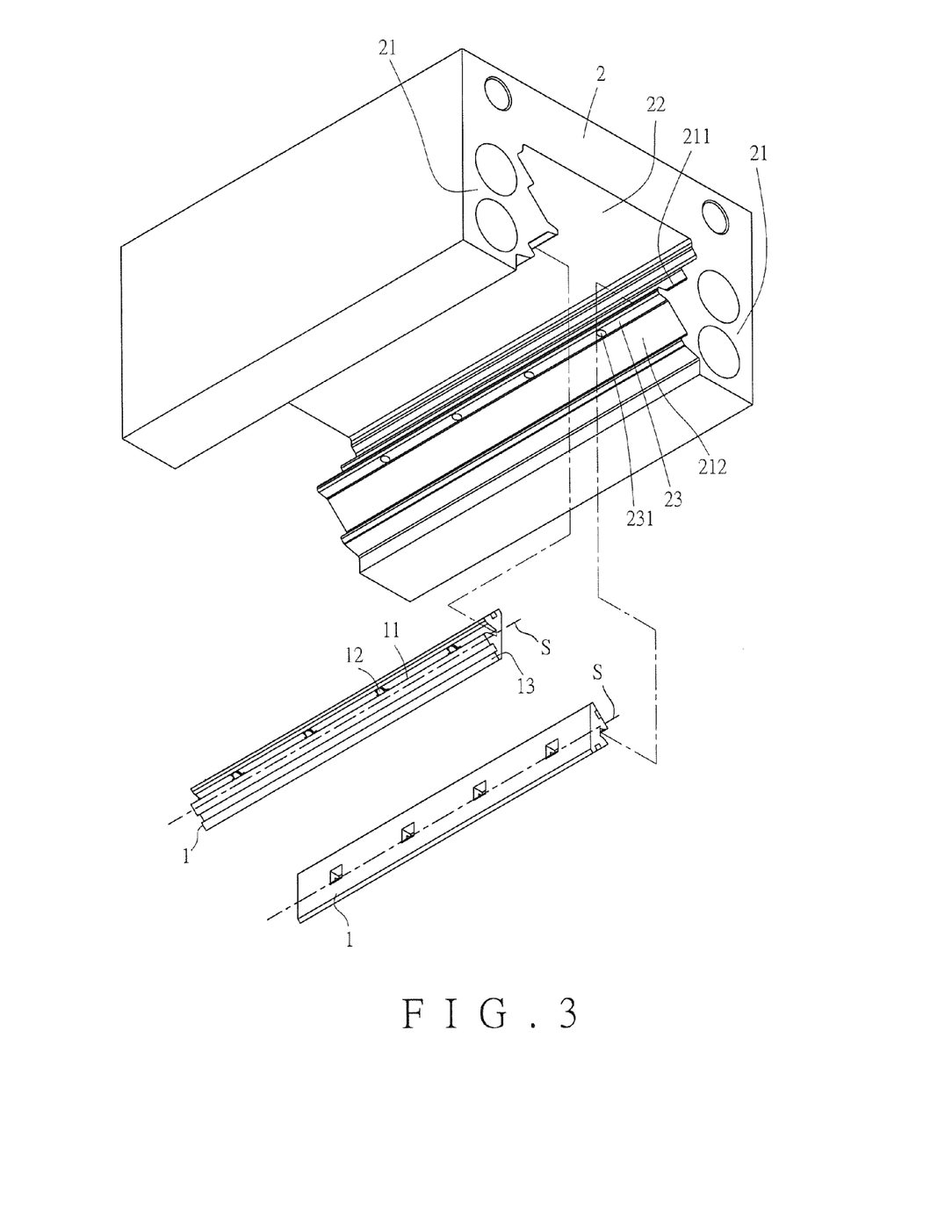
FIG. 3 is a perspective view showing how the middle retaining member and the slider in the first embodiment of the present invention are put together.
Figure 4:
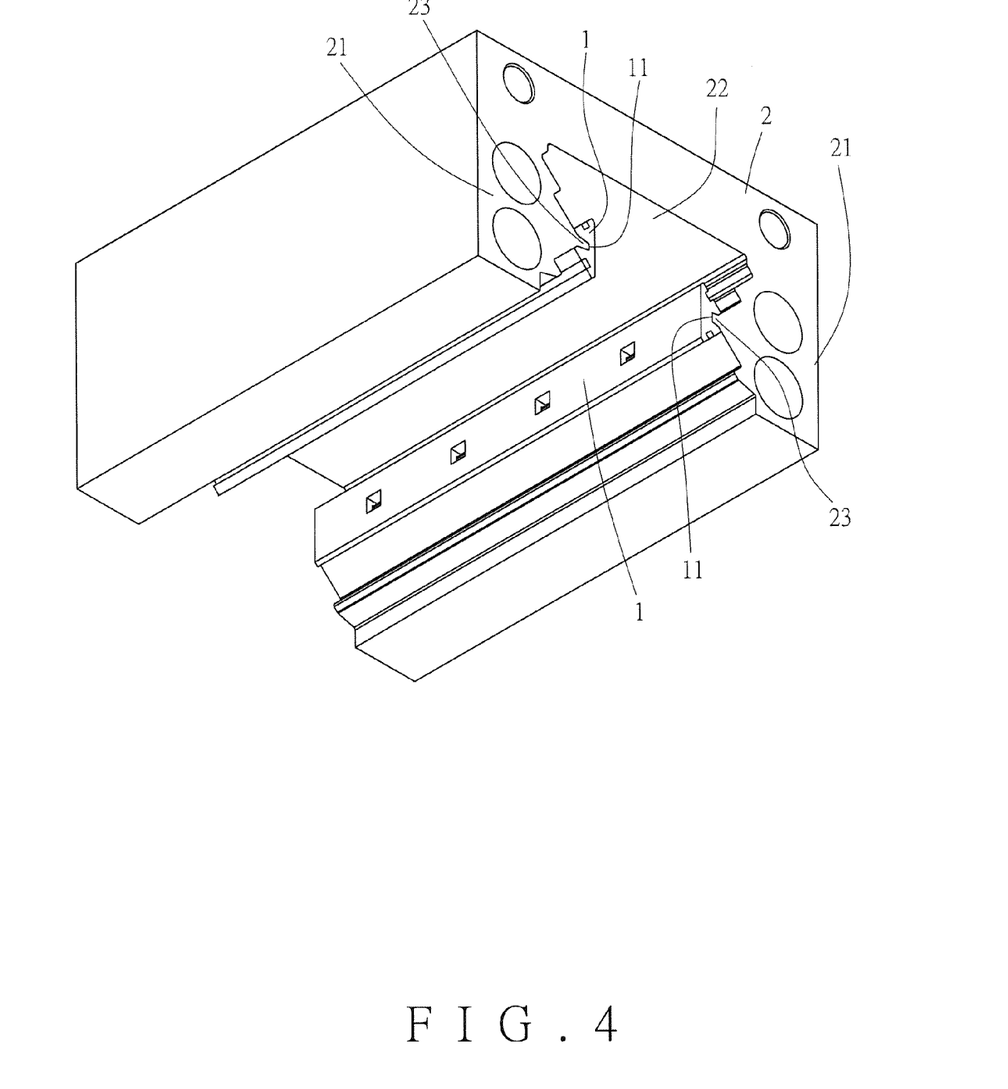
FIG. 4 is an assembled perspective view of the middle retaining member and the slider in the first embodiment of the present invention.
Figure 5:
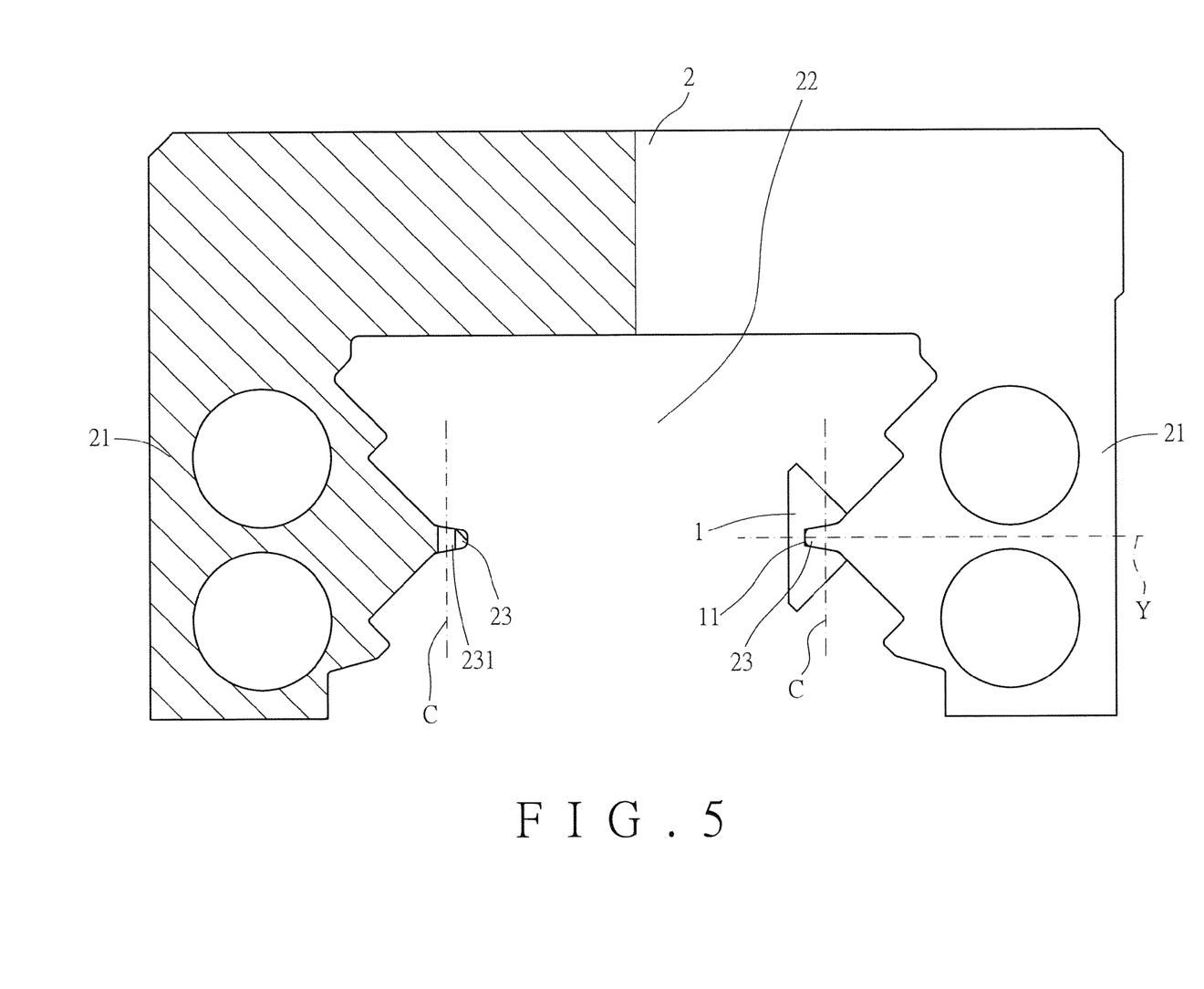
FIG. 5 is a partially sectional view of the slider in the first embodiment of the present invention, in which the right-hand side of the drawing schematically shows a middle retaining member connected to a protrusion, while the left-hand side of the drawing schematically shows the configuration of a positioning hole in the opposite protrusion, to which no middle retaining member is connected.

Referring to FIG. 3, FIG. 4, and FIG. 5, the middle retaining member 1 is installed on a slider 2. The slider 2 has an inverted square U-shaped cross-section with two feet 21. A mounting portion 22 is formed between the two feet 21 so that the slider 2 can sit astride the slide rail E. The two feet 21 each has an inner side that is provided with two rail surfaces 211 and 212. Between each pair of the rail surfaces 211 and 212 is a protrusion 23 which projects in a transverse direction Y, extends along the axial direction S, and is formed with a plurality of positioning holes 231 evenly arranged along the axial direction S and corresponding to the positioning blocks 12 of the middle retaining member 1. The positioning holes 231 penetrate the protrusions 23 in a direction defined as a connecting direction C, which is perpendicular to both the axial direction S and the transverse direction Y. The positioning holes 231 can be made from below the slider 2 without interference by any other parts and therefore feature ease of production.

Figure 6:
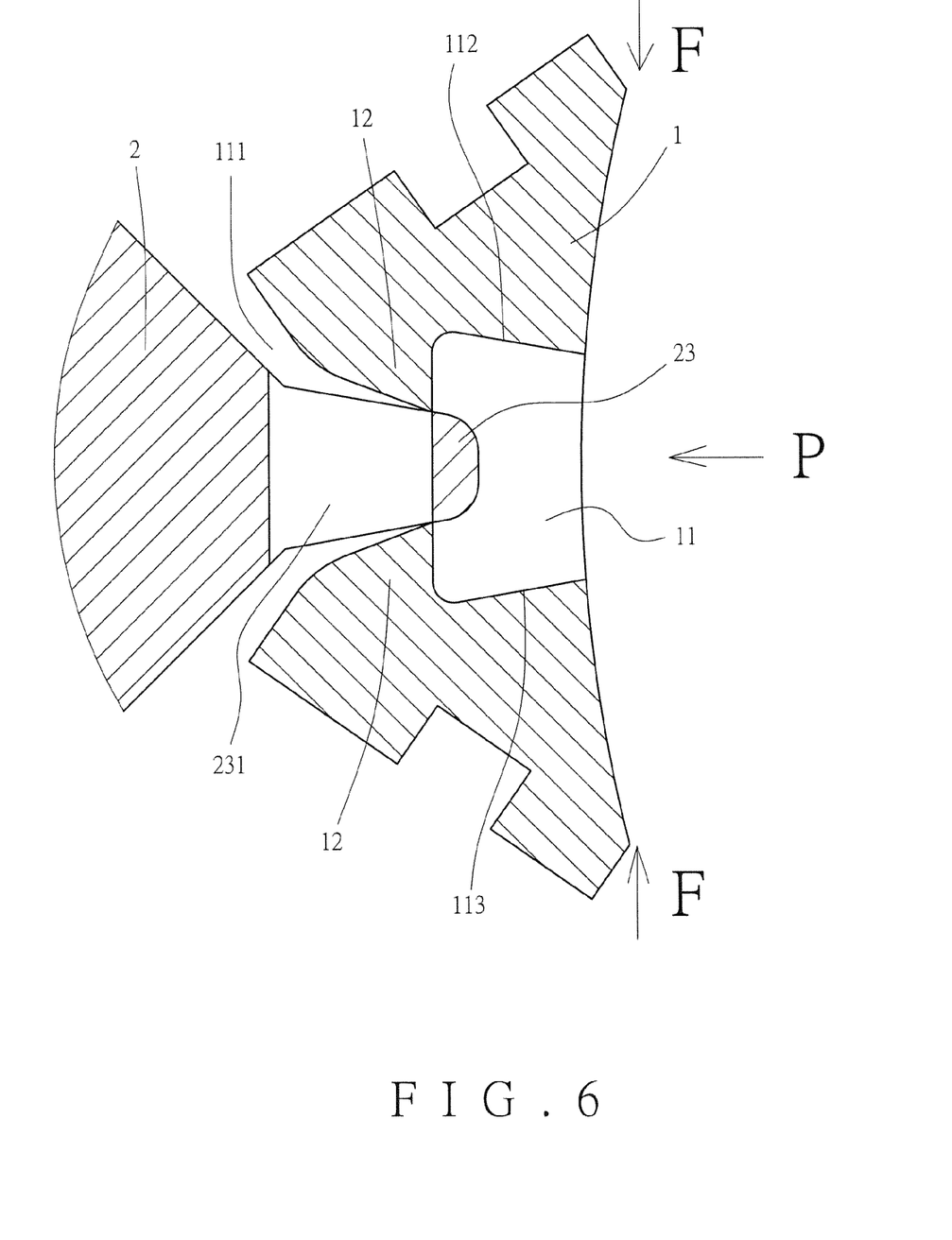
FIG. 6 schematically shows an assembly step of the first embodiment of the present invention, in which a groove of the middle retaining member is forced open so that the positioning blocks in the groove can easily engage in the positioning holes in the protrusion of the slider.
Figure 7:
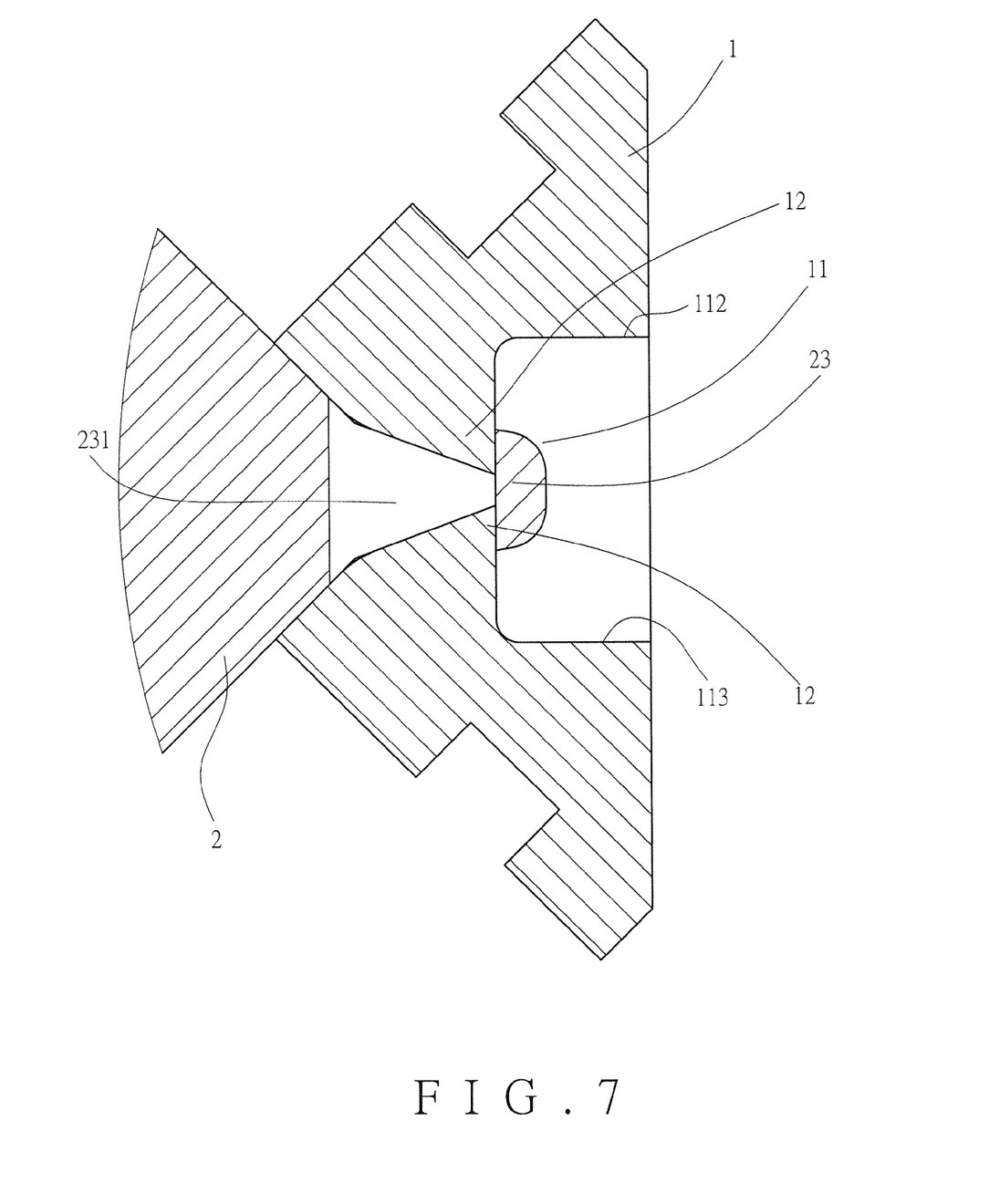
FIG. 7 schematically shows how the positioning blocks in the groove of the middle retaining member are engaged in the positioning holes in the protrusion of the slider in the first embodiment of the present invention.

Reference is now made to FIG. 6 and FIG. 7. To install the middle retaining member 1 to the slider 2, an external force F is applied to open the opening 111 of the groove 11 of the middle retaining member 1, and then a pushing force P is applied to fit the groove 11 of the middle retaining member 1 onto the protrusion 23 of the slider 2, thus bringing the positioning blocks 12 to the positioning holes 231. After that, the middle retaining member 1 is released, allowing the positioning blocks 12 to engage in the positioning holes 231 completely, and thereby fixing the middle retaining member 1 to the protrusion 23. The connection between the positioning blocks 12 and the positioning holes 231 in the connecting direction C is advantageous in that not only is the manufacturing process made easy, as mentioned above, but also production cost can be lowered due to the reduced number of components and ease of assembly. It should be pointed out that, referring again to FIG. 1, the correspondingly connected positioning holes 231 and positioning blocks 12 in this embodiment are evenly arranged in the axial direction S along the protrusion 23 of the slider 2 and the middle retaining member 1 respectively. If the middle retaining member 1 in this embodiment is equally divided along the axial direction S into two end portions 14 and a middle portion 15 between the two end portions 14, the positioning blocks 12 are evenly distributed in each of the two end portions 14 and the middle portion 15. In FIG. 1, the middle retaining member 1 has a length L, and the positioning blocks 12 are provided on the middle retaining member 1 at a fixed interval D and are therefore evenly distributed in the end portions 14 and the middle portion 15. As such, connection between the middle retaining member 1 and the protrusion 23 takes place along their entire lengths, and all the connected positions are equally restrictive. The strength of connection between the middle retaining member 1 and the protrusion 23 is therefore increased, allowing the two components to withstand greater stress in the connected state.

Figure 8:
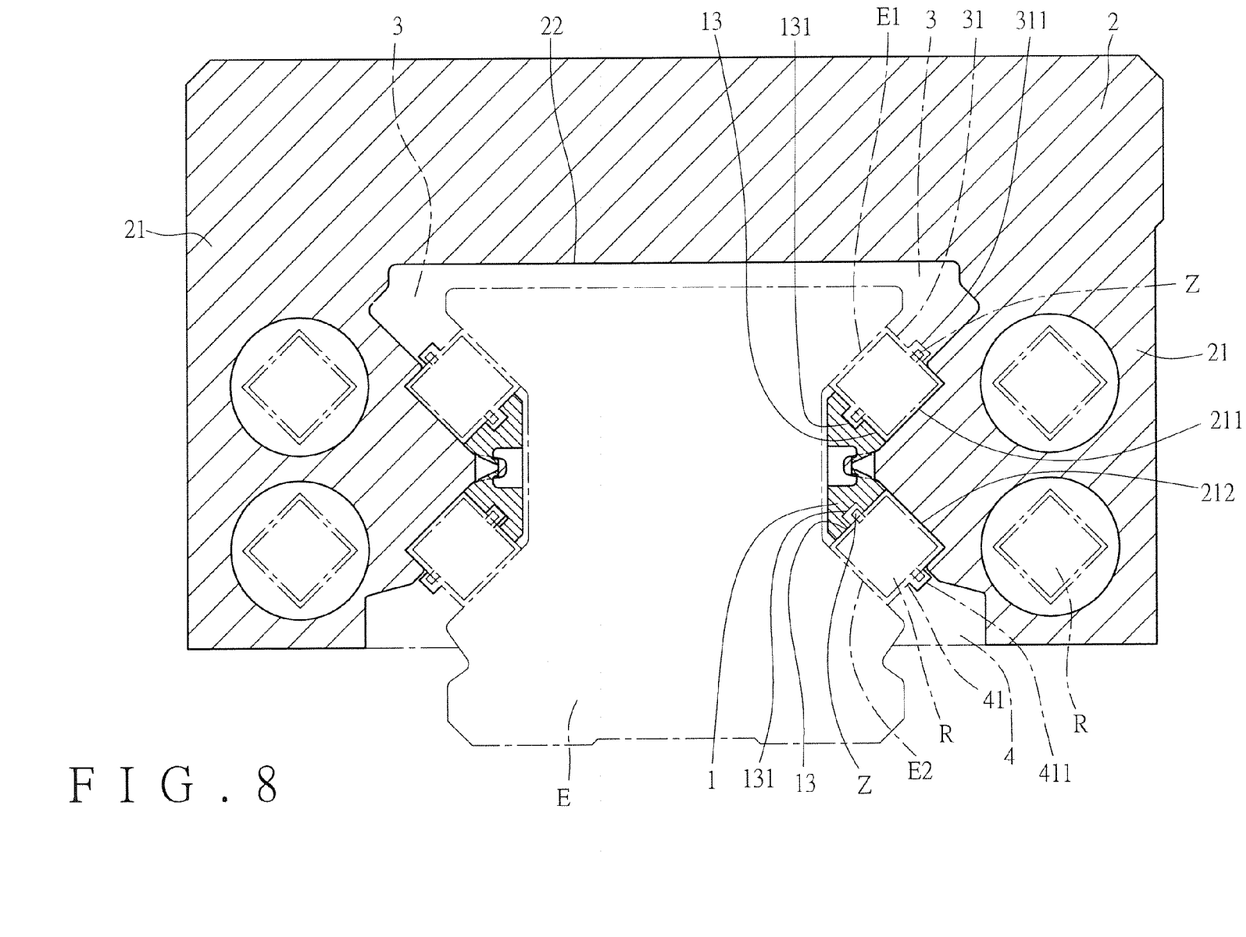
FIG. 8 schematically shows how the slider in the first embodiment of the present invention is further connected with an upper retaining member and a lower retaining member, sits astride a slide rail, and has rolling elements put in place.

Referring to FIG. 8, the assembly process of the slider assembly of the present invention further includes connecting an upper retaining member 3 and a lower retaining member 4 to the slider 2 and placing rows of rolling elements R in place, wherein each row of the rolling elements R is retained in the retaining chain Z. The two ends of the slider 2 are then covered with end caps respectively. (The end caps, which are not shown in the drawing, are well known in the art and therefore will not be described in detail herein.) Once the slider assembly is fitted astride the slide rail E, a linear guide rail is completed and ready to be used. In order for the rolling elements R to drive the slider assembly along the slide rail E, referring to the right-hand side of FIG. 8, an upper load channel and a lower load channel are formed jointly by the retaining surfaces 13 of the middle retaining member 1, the rail surfaces 211 and 212 of the slider 2, retaining surfaces 31 and 41 respectively provided by the upper retaining member 3 and the lower retaining member 4, and rail surfaces E1 and E2 provided by the slide rail E. The retaining chains Z are guided by the guide grooves 131 of the middle retaining member 1 and guide grooves 311 and 411 respectively provided by the retaining surfaces 31 and 41 of the upper retaining member 3 and the lower retaining member 4.

Figure 9:
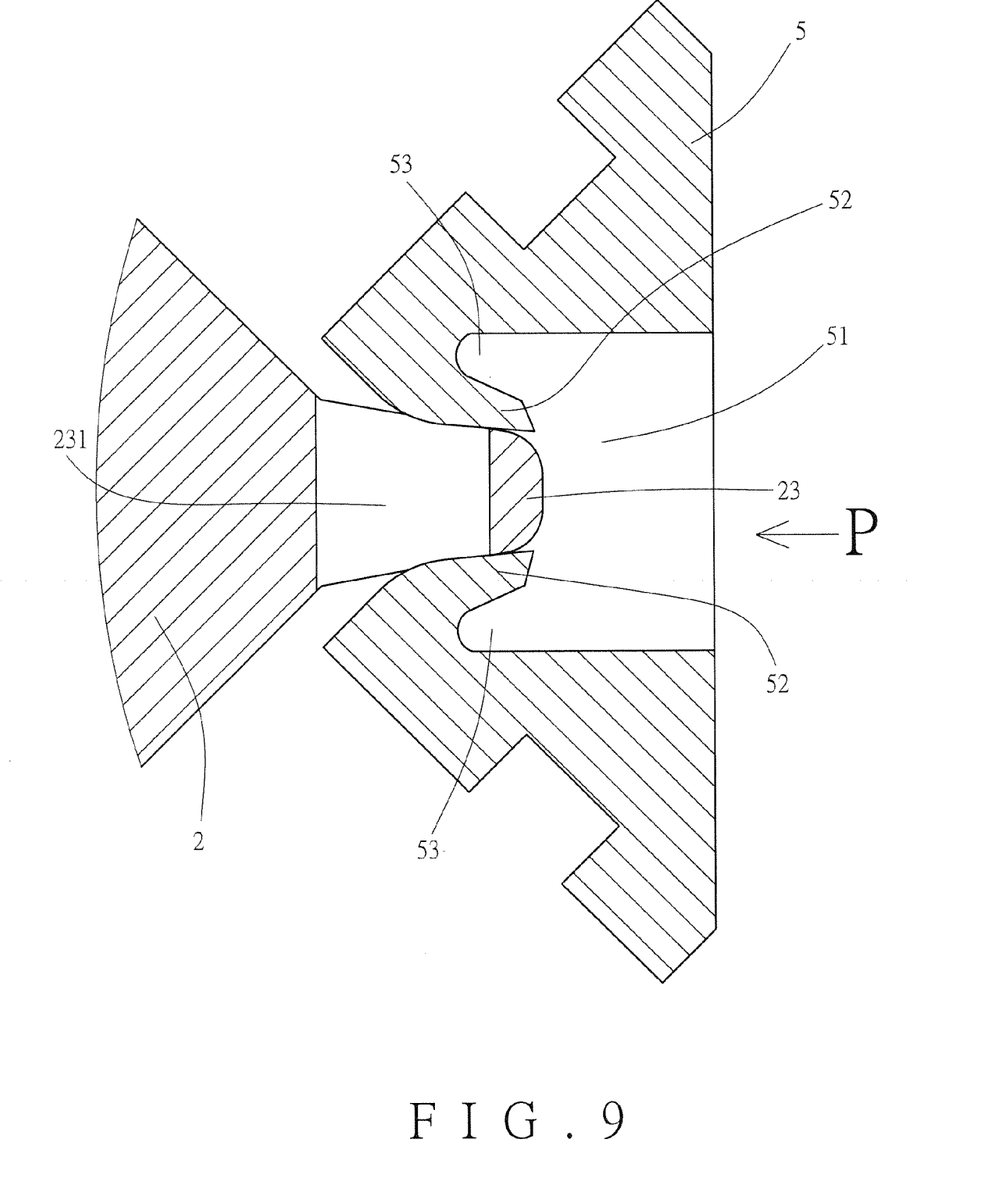
FIG. 9 schematically shows the recess provided in each positioning block in the groove of the middle retaining member in the second embodiment of the present invention, wherein the recesses enable deformation of the positioning blocks so that the positioning blocks can engage in the positioning holes in the protrusion of the slider.
Figure 10:
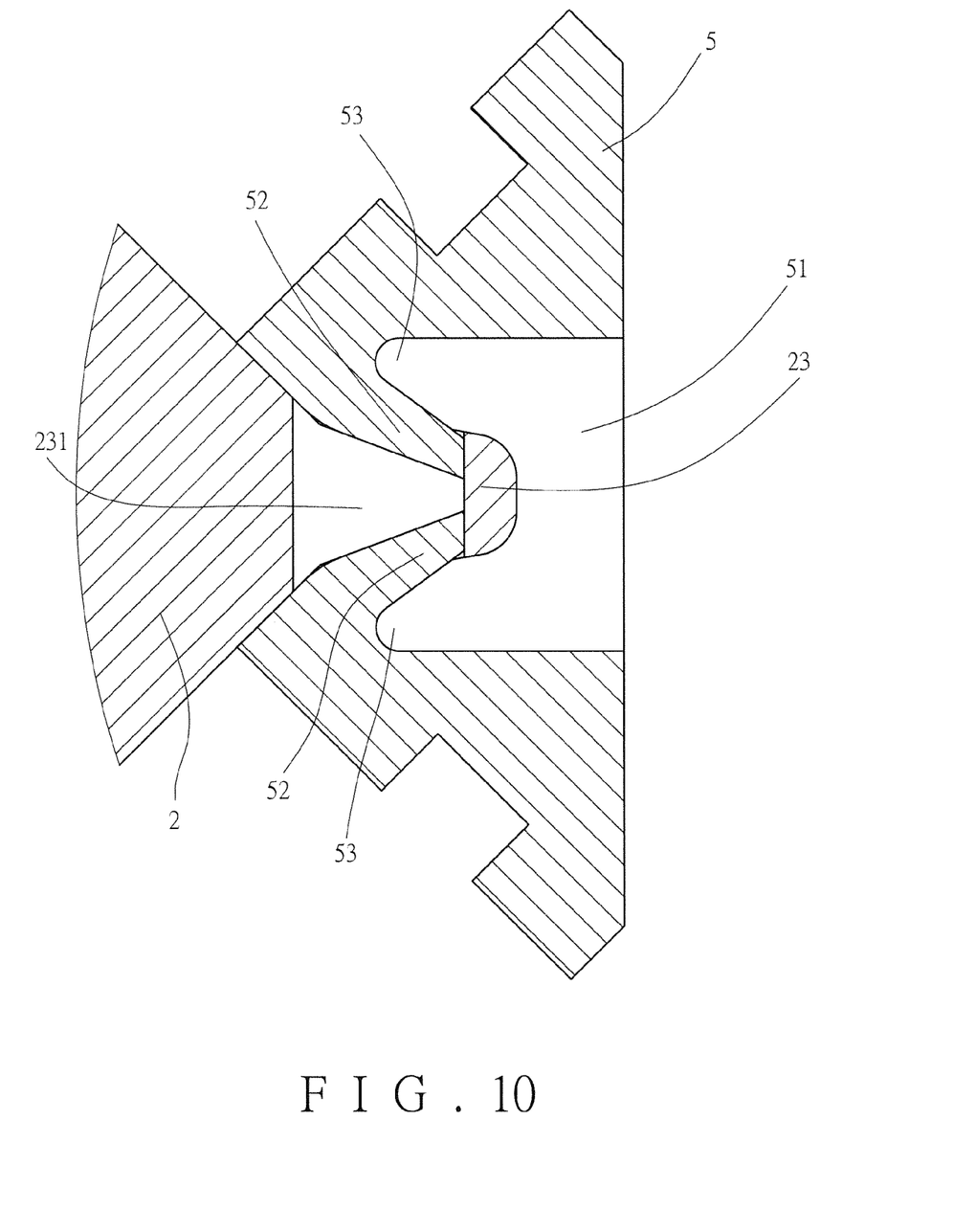
FIG. 10 schematically shows how the positioning blocks in the groove of the middle retaining member in the second embodiment of the present invention are engaged in the positioning holes in the protrusion of the slider.

FIG. 9 and FIG. 10 show the second embodiment of the present invention. In this embodiment, the middle retaining member 5 has generally the same configuration as the middle retaining member 1 in the first embodiment. The differences between the two embodiments are shown in the drawings and detailed as follows. The middle retaining member 5 has a groove 51 whose inner surface is provided with a plurality of evenly arranged and corresponding positioning blocks 52. Each of the positioning blocks 52 of the middle retaining member 5 is provided with a recess 53. When it is desired to install the middle retaining member 5 to the protrusion 23 of the slider 2, there is no need to apply the force F (see FIG. 6) for opening the groove 51; only the pushing force P is required to press the positioning blocks 52 against the protrusion 23. This is because the positioning blocks 52 can readily engage in the positioning holes 231 of the protrusion 23 through elastic deformation and restoration caused by the pushing force P and enabled by the recesses 53, which provide the positioning blocks 52 with room for deformation.

Figure 11:
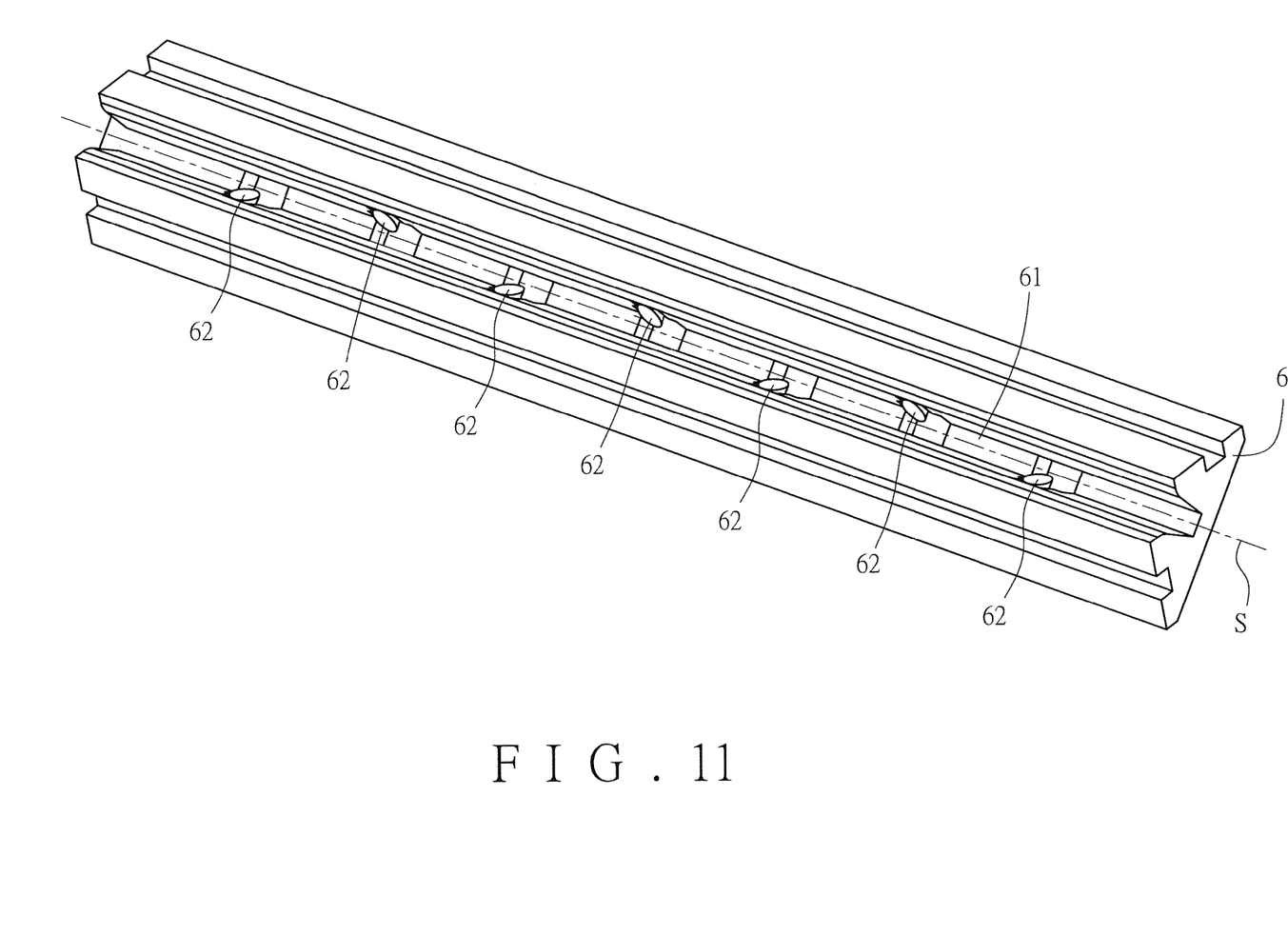
FIG. 11 schematically shows how the positioning blocks in the third embodiment of the present invention are alternately arranged in the groove of the middle retaining member along the axial direction.

The third embodiment of the present invention is shown in FIG. 11, in which the middle retaining member 6 has generally the same configuration as the middle retaining member 1 in the first embodiment except that the positioning blocks 62 in the groove 61 of the middle retaining member 6 are alternately arranged. This embodiment has the same effects as the first embodiment.

Figure 12:
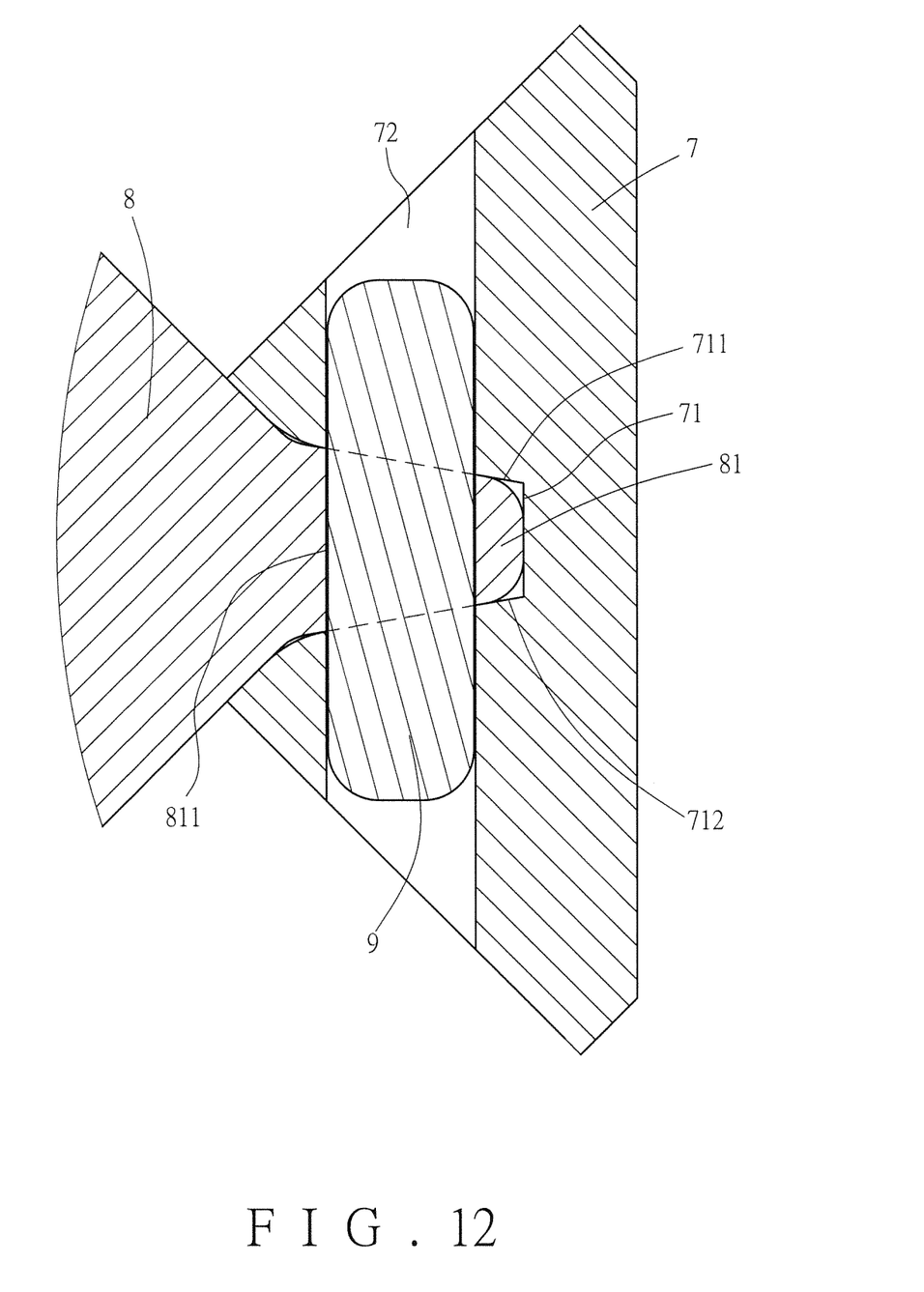
FIG. 12 schematically shows how the middle retaining member is connected to the protrusion of the slider by a pin in the fourth embodiment of the present invention.

FIG. 12 shows the fourth embodiment of the present invention and more particularly a middle retaining member 7 and a slider 8. The middle retaining member 7 extends along the aforesaid axial direction S. (The extending of the middle retaining member 7 can be readily known from the previous embodiments and therefore is not shown in FIG. 12.) The middle retaining member 7 has a groove 71 whose inner surface includes two opposite lateral surfaces 711 and 712. In addition, the middle retaining member 7 has a plurality of through holes 72 extending through the two lateral surfaces 711 and 712. The through holes 72 are distributed in the same manner as the positioning blocks 12 in the first embodiment. Like the slider 2 in the first embodiment, the slider 8 has two opposite protrusions 81. Each protrusion 81 has a plurality of through holes 811 corresponding respectively to the through holes 72. To assemble, the groove 71 of the middle retaining member 7 is mounted on the corresponding protrusion 81 of the slider 8, before a pin 9 is inserted through each pair of the corresponding through hole 72 and through hole 811 to connect the middle retaining member 7 and the protrusion 81. This embodiment can achieve the same effects as the first embodiment.

While the operation, use, and effects of the present invention have been fully disclosed through the foregoing embodiments, it is understood that the embodiments are not intended to restrict the scope of the present invention, which encompasses all simple, equivalent changes and modifications based on the claims and specification of the present invention.

The invention claimed is:

1. A slider assembly, configured for reciprocating linear movement on a slide rail along an axial direction via circulating rolling movement of rows of rolling elements, the slider assembly comprising:
   a slider provided with at least one foot, the foot having at least two rail surfaces and a protrusion between the two rail surfaces, wherein the protrusion projects in a transverse direction, extends along the axial direction, and is provided with a first positioning portion; and
   a middle retaining member extending along the axial direction, the middle retaining member being provided with a second positioning portion, the second positioning portion being connected with the first positioning portion to fix the middle retaining member to the protrusion, wherein a connecting direction of the first positioning portion and the second positioning portion is perpendicular to the axial direction and the transverse direction.

2. The slider assembly of claim 1, wherein the middle retaining member is connected to the protrusion securely along entire lengths thereof in the axial direction.

3. The slider assembly of claim 1, wherein a plurality of said first positioning portions and a plurality of said second positioning portions are arranged at intervals along the axial direction.

4. The slider assembly of claim 1, wherein the middle retaining member is provided with a groove along the axial direction, wherein the groove is mounted on the protrusion of the slider, and the groove has an inner surface including two opposite lateral surfaces; a plurality of said first positioning portions and a plurality of said second positioning portions are arranged at intervals, and the second positioning portions are located on the two opposite lateral surfaces in such a way that the second positioning portions on one of the two opposite lateral surfaces either correspond respectively to or are alternately arranged with respect to the second positioning portions on the other of the two opposite lateral surfaces along the axial direction.

5. The slider assembly of claim 3, wherein the middle retaining member is equally divided along the axial direction into two end portions and a middle portion between the two end portions, and the two end portions and the middle portion are at least each provided with one said second positioning portion.

6. The slider assembly of claim 1, wherein the first positioning portion is a positioning hole, and the second positioning portion is a positioning block corresponding to the positioning hole.

7. The slider assembly of claim 6, wherein the middle retaining member is made of an elastic material and is provided with a groove along the axial direction, the groove is mounted on the protrusion of the slider, the groove has an inner surface including two opposite lateral surfaces and a bottom surface connecting the two opposite lateral surfaces, and the positioning block is located on either of the two opposite lateral surfaces and increases in size toward the bottom surface.

8. The slider assembly of claim 7, wherein the positioning block has an end portion adjacent to the bottom surface and provided with a recess.

9. The slider assembly of claim 1, wherein both the first positioning portion and the second positioning portion are through holes, and a pin is inserted through the through holes to connect the middle retaining member and the protrusion.

10. The slider assembly of claim 9, wherein the middle retaining member is provided with a groove along the axial direction, the groove of the middle retaining member is mounted on the protrusion of the slider, the groove has an inner surface including two opposite lateral surfaces, and the pin extends through the two opposite lateral surfaces to connect the middle retaining member and the protrusion.

11. The slider assembly of claim 1, wherein the middle retaining member has two retaining surfaces for retaining rolling elements, and each of the retaining surfaces has a guide groove for guiding a retaining chain.

* * * * *